US008525846B1

United States Patent
Hickman et al.

(10) Patent No.: US 8,525,846 B1
(45) Date of Patent: Sep. 3, 2013

(54) SHADER AND MATERIAL LAYERS FOR RENDERING THREE-DIMENSIONAL (3D) OBJECT DATA MODELS

(71) Applicants: Ryan Hickman, Mountain View, CA (US); James J. Kuffner, Jr., Mountain View, CA (US); Anthony Gerald Francis, Jr., San Jose, CA (US); Arshan Poursohi, Berkeley, CA (US); James R. Bruce, Sunnyvale, CA (US); Thor Lewis, San Francisco, CA (US); Chaitanya Gharpure, Sunnyvale, CA (US)

(72) Inventors: Ryan Hickman, Mountain View, CA (US); James J. Kuffner, Jr., Mountain View, CA (US); Anthony Gerald Francis, Jr., San Jose, CA (US); Arshan Poursohi, Berkeley, CA (US); James R. Bruce, Sunnyvale, CA (US); Thor Lewis, San Francisco, CA (US); Chaitanya Gharpure, Sunnyvale, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/644,599

(22) Filed: Oct. 4, 2012

Related U.S. Application Data

(60) Provisional application No. 61/558,910, filed on Nov. 11, 2011.

(51) Int. Cl.
*G09G 5/00* (2006.01)

(52) U.S. Cl.
USPC ............ 345/581; 345/582; 345/589; 345/619

(58) Field of Classification Search
USPC .......................... 717/163; 715/765; 345/582
See application file for complete search history.

(56) References Cited

U.S. PATENT DOCUMENTS

| 5,255,352 | A * | 10/1993 | Falk ............................ 345/582 |
| 2005/0081161 | A1 * | 4/2005 | MacInnes et al. ............ 715/765 |
| 2008/0049014 | A1 * | 2/2008 | Haimerl et al. ............... 345/419 |
| 2010/0122243 | A1 * | 5/2010 | Breton et al. ................. 717/163 |
| 2011/0216077 | A1 * | 9/2011 | Morein et al. ................ 345/501 |
| 2012/0176478 | A1 | 7/2012 | Wang et al. |
| 2012/0177283 | A1 | 7/2012 | Wang et al. |
| 2013/0070995 | A1 * | 3/2013 | Chou et al. .................... 382/131 |
| 2013/0113801 | A1 * | 5/2013 | Monson et al. ............... 345/426 |

OTHER PUBLICATIONS

Autodesk 123D Catch, Catch and carry, Turn ordinary photos into extraordinary 3D models, www.123dapp.com/catch, 2013.

* cited by examiner

*Primary Examiner* — Phi Hoang
(74) *Attorney, Agent, or Firm* — McDonnell Boehnen Hulbert & Berghoff LLP

(57) ABSTRACT

Methods and systems for material refinement for portions of a three-dimensional (3D) object data model are provided. An example method may include rendering a portion of a 3D object data model, and determining a first appearance metric between an appearance of the portion in the rendered view and a two-dimensional (2D) image. For one or more iterations, a modification to material properties associated with the portion may be determined based on the first appearance metric, and another view of the portion of the 3D object data model may be rendered. Also for the one or more iterations, another appearance metric between and an appearance of the portion in the rendered another view and the 2D image may be determined. Additionally, modified material properties for the portion that are associated with a minimum appearance metric of the one or more iterations may be stored for the 3D object data model.

20 Claims, 7 Drawing Sheets

Computer Program Product 700

Signal Bearing Medium 701

Program Instructions 702

- rendering a view of a portion of a three-dimensional (3D) object data model of an object based on material properties associated with the portion, wherein the 3D object data model comprises material properties associated with geometry of the 3D object data model;

- determining a first appearance metric between an appearance of the portion in the rendered view and an appearance of the portion in a two-dimensional (2D) image;

- for one or more iterations:
  - based on the first appearance metric, determining a modification to one or more of the material properties associated with the portion;
  - rendering another view of the portion of the 3D object data model based on the modification to the material properties associated with the portion; and
  - determining another appearance metric between an appearance of the portion in the 2D image and an appearance of the portion in the rendered another view; and

- storing the 3D object data model of the object having modified material properties for the portion, wherein the modified material properties are associated with a minimum appearance metric of the one or more iterations.

| Computer Readable Medium 703 | Computer Recordable Medium 704 | Communications Medium 705 |

FIGURE 7

SHADER AND MATERIAL LAYERS FOR RENDERING THREE-DIMENSIONAL (3D) OBJECT DATA MODELS

CROSS-REFERENCE TO RELATED APPLICATIONS

This application claims the benefit of U.S. Provisional Application No. 61/558,910 filed on Nov. 11, 2011, the entirety of which is herein incorporated by reference.

BACKGROUND

In computer graphics, three-dimensional (3D) modeling involves generation of a representation of a 3D surface of an object. The representation may be referred to as a 3D object data model, and can be rendered or displayed as a two-dimensional image via 3D rendering or displayed as a three-dimensional image. 3D object data models represent a 3D object using a collection of points in 3D space, connected by various geometric entities such as triangles, lines, curved surfaces, etc. Various techniques exist for generating 3D object data models utilizing point clouds and geometric shapes, for examples.

Being a collection of data, 3D models can be created by hand, algorithmically, or by scanning objects, for example. As an example, an artist may manually generate a 3D image of an object that can be used as the 3D model. As another example, a given object may be scanned from a number of different angles, and the scanned images can be combined to generate the 3D image of the object. As still another example, an image of an object may be used to generate a point cloud that can be algorithmically processed to generate the 3D image.

3D object data models may include solid models that define a volume of the object, or may include shell or boundary models that represent a surface (e.g. the boundary) of the object. Because an appearance of an object depends largely on an exterior of the object, boundary representations are common in computer graphics.

3D models are used in a wide variety of fields, and may be displayed using a number of different types of interfaces. Example interfaces may provide functionality to enable interaction between a user and the 3D models.

SUMMARY

In one example aspect, a method is provided that includes rendering a portion of a three-dimensional (3D) object data model of an object based on material properties associated with the portion. The 3D object data model may include material properties associated with geometry of the 3D object data model. The method may also include using a computing device to determine a first appearance metric between an appearance of the portion in the rendered view and an appearance of the portion in a two-dimensional (2D) image. According to the method, for one or more iterations, a modification to one or more material properties associated with the portion may be determined based on the first appearance metric, and another view of the portion of the 3D object data model may be rendered based on the modification. Also for the one or more iterations, another appearance metric between an appearance of the portion in the 2D image and an appearance of the portion in the rendered another view may be determined. Additionally, the method may include storing the 3D object data model of the object having modified material properties for the portion. The modified material properties may be associated with a minimum appearance metric of the one or more iterations.

In another example aspect, a computer-readable medium having stored therein instructions, that when executed by a computing device, cause the computing device to perform functions is provided. The functions may include rendering a portion of a three-dimensional (3D) object data model of an object based on material properties associated with the portion. The 3D object data model may include material properties associated with geometry of the 3D object data model. The functions may also include determining a first appearance metric between an appearance of the portion in the rendered view and an appearance of the portion in a two-dimensional (2D) image. According to the functions, for one or more iterations, a modification to one or more material properties associated with the portion may be determined based on the first appearance metric, and another view of the portion of the 3D object data model may be rendered based on the modification. Also for the one or more iterations, another appearance metric between an appearance of the portion in the 2D image and an appearance of the portion in the rendered another view may be determined. Additionally, the functions may include storing the 3D object data model of the object having modified material properties for the portion. The modified material properties may be associated with a minimum appearance metric of the one or more iterations.

In still another example aspect, a system is provided that includes a rendering component, a refinement component, and a material component. The rendering component may be configured to render a view of a portion of a three-dimensional (3D) object data model of an object based on material properties associated with geometry of the 3D object data model. The refinement component may be configured, for one or more iterations, to determine an appearance metric between an appearance of the portion in a view that is rendered by the rendering component and an appearance of the portion in a two-dimensional (2D) image. Also for the one or more iterations, the refinement component may be configured to determine a modification to one or more of the materials properties associated with the portion based on the appearance metric, and provide the modification to the rendering component. The material component may be configured to store the 3D object data model of the object having modified material properties for the portion. The modified material properties may be associated with a minimum appearance metric of the one or more iterations.

The foregoing summary is illustrative only and is not intended to be in any way limiting. In addition to the illustrative aspects, embodiments, and features described above, further aspects, embodiments, and features will become apparent by reference to the figures and the following detailed description.

BRIEF DESCRIPTION OF THE FIGURES

FIG. 7 is a schematic illustrating a conceptual partial view of an example computer program product that includes a computer program for executing a computer process on a computing device, arranged according to at least some embodiments presented herein.

DETAILED DESCRIPTION

Figure 1:
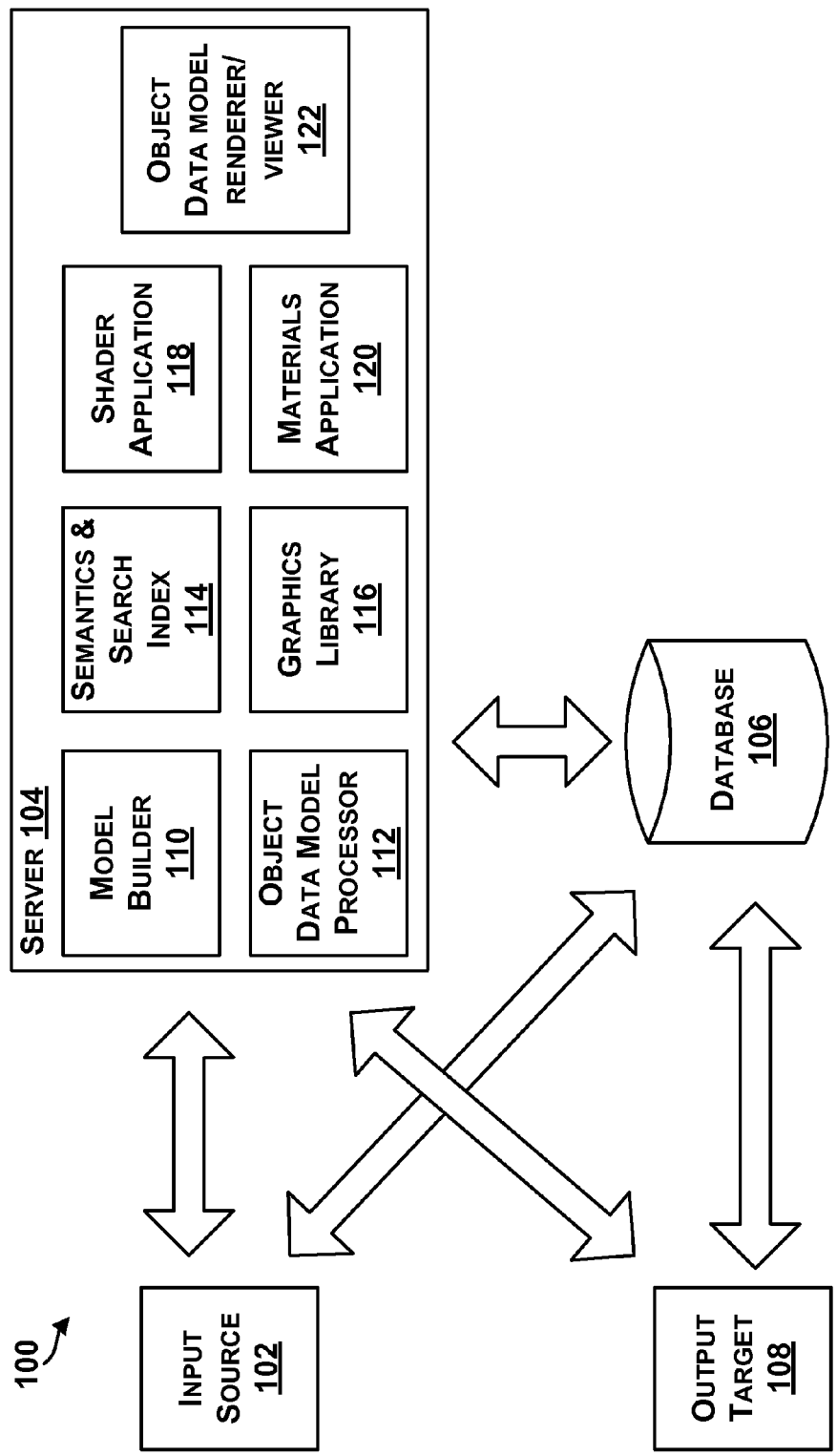
FIG. 1 illustrates an example system for object data modeling.

In the following detailed description, reference is made to the accompanying figures, which form a part hereof. In the figures, similar symbols typically identify similar components, unless context dictates otherwise. The illustrative embodiments described in the detailed description, figures, and claims are not meant to be limiting. Other embodiments may be utilized, and other changes may be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

This disclosure may disclose, inter alia, methods and systems for shader and material layers for rendering three-dimensional (3D) object data models. In some examples, a client device may receive a 3D object data model from a server and render a representation of the 3D object data model by executing a shader layer and a materials layer for various components of the 3D object data model. For instance, the 3D object data model may include components made of different types of materials, and the components may be separated based on type of material. Additionally, individual types of materials may be assigned a given shader to facilitate rendering the material. When a client device receives a 3D object data model, the client device may also receive shader and material information for the various components of the 3D object data model, and render the various components of the 3D object data model using the respective shaders for each type of material.

In one example, a modification to material properties for a 3D object data model may be automatically determined. For instance, a 3D object data model may be provided with default or generic material properties, such as predetermined textures available within a 3D modeling program used to generate the 3D object data model. In some cases, the material properties provided with a 3D object data model may be modified such that when a representation of the 3D object data model is rendered, the representation matches an actual appearance of a product represented by the 3D object data model.

According to an example method, a view of a portion of a 3D object data model may be rendered based on material properties associated with the portion. Subsequently, an appearance metric may be determined between an appearance of the portion in the rendered view and an appearance of the portion in a two-dimensional (2D) image. For example, the appearance metric may be a numerical distance between a representation of a color of the portion in the 2D image and a representation of a color of the portion in the rendered view. Based on the appearance metric, a modification to one or more of the material properties may be determined, and another view of the portion of the 3D object data model may be rendered based on the modified material properties. In one instance, modifying the material properties associated with the portion may include selecting a different shader for the portion. The method may further involve determining another appearance metric between the rendered another view and the 2D image. According to the example method, material properties associated with a minimum appearance metric may be stored with the 3D object data model.

In some instances, additional modifications to the material properties may be performed as part of an iterative method. For instance, information regarding whether a given modification increases or decreases the appearance metric may be provided as feedback and used to determine subsequent modifications to the material properties within a feedback loop. As another example, an expectation-maximization (EM) algorithm may be used to refine the material properties associated with a portion of the 3D object data model. Thus, in some examples, material properties associated with portions of a 3D object data model may be refined by comparing renderings of the 3D object data model with images of a product represented by the 3D object data model. In some instances, the methods for refinement of material properties described herein may automate the guess work and trial and metric associated with matching a rendering of a 3D object data model to a 2D image of the object or product represented by the 3D object data model.

Referring now to the figures, FIG. 1 illustrates an example system 100 for object data modeling. The system 100 includes an input source 102 coupled to a server 104 and a database 106. The server 104 is also shown coupled to the database 106 and an output target 108. The system 100 may include more or fewer components, and each of the input source 102, the server 104, the database 106, and the output target 108 may comprise multiple elements as well, or each of the input source 102, the server 104, the database 106, and the output target 108 may be interconnected as well. Thus, one or more of the described functions of the system 100 may be divided up into additional functional or physical components, or combined into fewer functional or physical components. In some further examples, additional functional and/or physical components may be added to the examples illustrated by FIG. 1.

Components of the system 100 may be coupled to or configured to be capable of communicating via a network (not shown), such as a local area network (LAN), wide area network (WAN), wireless network (e.g., a Wi-Fi network), or Internet, for example. In addition, any of the components of the system 100 may be coupled to each other using wired or wireless communications. For example, communication links between the input source 102 and the server 104 may include wired connections, such as a serial or parallel bus, or wireless links, such as Bluetooth, IEEE 802.11 (IEEE 802.11 may refer to IEEE 802.11-2007, IEEE 802.11n-2009, or any other IEEE 802.11 revision), or other wireless based communication links.

The input source 102 may be any source from which a 3D object data model may be received. In some examples, 3D model acquisition (shape and appearance) may be achieved by working with venders or manufacturers to scan objects in 3D. For instance, structured light scanners may capture images of an object and a shape of the object may be recovered using monochrome stereo cameras and a pattern projector. In other examples, a high-resolution DSLR camera may be used to capture images for color texture information. In still other examples, a raw computer-aided drafting (CAD) set of drawings may be received for each object. Thus, the input source 102 may provide a 3D object data model, in various forms, to the server 104. As one example, multiple scans of an object may be processed into a merged mesh and assets data model, and provided to the server 104 in that form.

The server 104 includes a model builder 110, an object data model processor 112, a semantics and search index 114, a graphics library 116, a shader application 118, a materials application 120, and an object data model renderer/viewer 122. Any of the components of the server 104 may be coupled to each other. In addition, any components of the server 104 may alternatively be a separate component coupled to the server 104. The server 104 may further include a processor and memory including instructions executable by the processor to perform functions of the components of the server 104, for example.

The model builder 110 receives the mesh data set for each object from the input source 102, which may include a data set defining a dense surface mesh geometry, and may generate an animated model of the object in 3D. For example, the model builder 110 may perform coherent texture unwrapping from the mesh surface, and determine textures of surfaces emulated from the geometry.

The object data model processor 112 may also receive the mesh data set for each object from the input source 102 and generate display meshes. For instance, the scanned mesh images may be decimated (e.g., from 5 million to 120,000 surfaces) utilizing texture-preserving decimation. Texture map generation can also be performed to determine color texture for map rendering. Texture map generation may include using the mesh data sets (H) that have colors but no ultraviolet (UV) unwrapping to generate a mesh (D) with UV unwrapping but no colors. As an example, for a single output texture pixel of an image, processing may include, for a given point in UV, determine a triangle in the mesh's UV mapping (D), and using triangle-local coordinates, move to an associated 3D point on the mesh. A bidirectional ray may be cast along the triangle's normal to intersect with the mesh (H), and color, normal and displacement may be used for an output. To generate an entire texture image, each pixel in the image can be processed.

The semantics and search index 114 may receive captured images or processed images that have been decimated and compressed, and may perform texture resampling and also shape-based indexing. For example, for each object, the semantics and search index 114 may index or label components of the images (e.g., per pixel) as having a certain texture, color, shape, geometry, attribute, etc. The semantics and search index 114 may receive the 3D object data model file or files comprising the 3D object data model from the model builder 110 or the object data model processor 112, and may be configured to label portions of the file or each file individually with identifiers related to attributes of the file.

In some examples, the semantics and search index 114 may be configured to provide annotations for aspects of the 3D object data models. For instance, an annotation may be provided to label or index aspects of color, texture, shape, appearance, description, function, etc., of an aspect of a 3D object data model. Annotations may be used to label any aspect of an image or 3D object data model, or to provide any type of information. Annotations may be performed manually or automatically. In examples herein, an annotated template of an object in a given classification or category may be generated that includes annotations, and the template may be applied to all objects in the given classification or category to apply the annotations to all objects.

The graphics library 116 may include a WebGL or OpenGL mesh compression to reduce a mesh file size, for example. The graphics library 116 may provide the 3D object data model in a form for display on a browser, for example. In some examples, a 3D object data model viewer may be used to display images of the 3D objects data models. The 3D object data model viewer may be implemented using WebGL within a web browser, or OpenGL, for example.

The shader application 118 may be configured to apply a shader to portions of the 3D object data model file or files of the 3D object data model according to the indexes of the file (as labeled by the semantics and search index 114) to generate a 3D image. The shader application 118 may be executed to apply a shader from a number of shaders according to the indexes of the file. The shader may include information related to texture, color, appearance, etc., of a portion of the 3D image.

In one example, the shader application 118 may be executed to render an image with shading attributes as defined by indexes of the files. For example, objects with multiple surfaces may have different attributes for each surface, and the shader application 118 may be executed to render each surface accordingly.

The materials application 120 may be configured to apply a material to portions of the 3D object data model file or to files of the 3D object data model according to the indexes of the file (as labeled by the semantics and search index 114) to generate a 3D image. The materials application 120 may be executed to apply a material from a number of materials according to the indexes of the file. The materials application may apply any material, such as leather, metal, wood, etc., so as to render an appearance of a portion of the 3D image.

In one example, the materials application 120 may access a database that includes information regarding a number of reference materials (e.g., brass, fur, leather), and objects with multiple materials may be separated into distinct portions. As an example, a hood on a car may include a hood ornament, and the hood may be painted while the ornament may have a chrome finish. The materials application 120 and the shader application 118 can be executed to identify two separate materials (e.g., the painted hood and the chrome hood ornament) and render each material with an appropriate shader.

The object data model renderer/viewer 122 may receive the 3D object data model file or files and execute the shader application 118 and the materials application 120 to render a 3D image, representation, or view of the 3D object data model or a portion of the 3D object data model.

The database 106 may store all data sets for a 3D object data model in any number of various forms from raw, captured data to processed data for display.

The output target 108 may include a number of different targets, such as a webpage on the Internet, a search engine, a database, etc. The output target 108 may include a 3D object data model viewer that enables product advertisements or product searches based on the 3D object data model.

In examples herein, the system 100 may be used to acquire data of an object, process the data to generate a 3D object data model, and render the 3D object data model for display.

Figure 2:
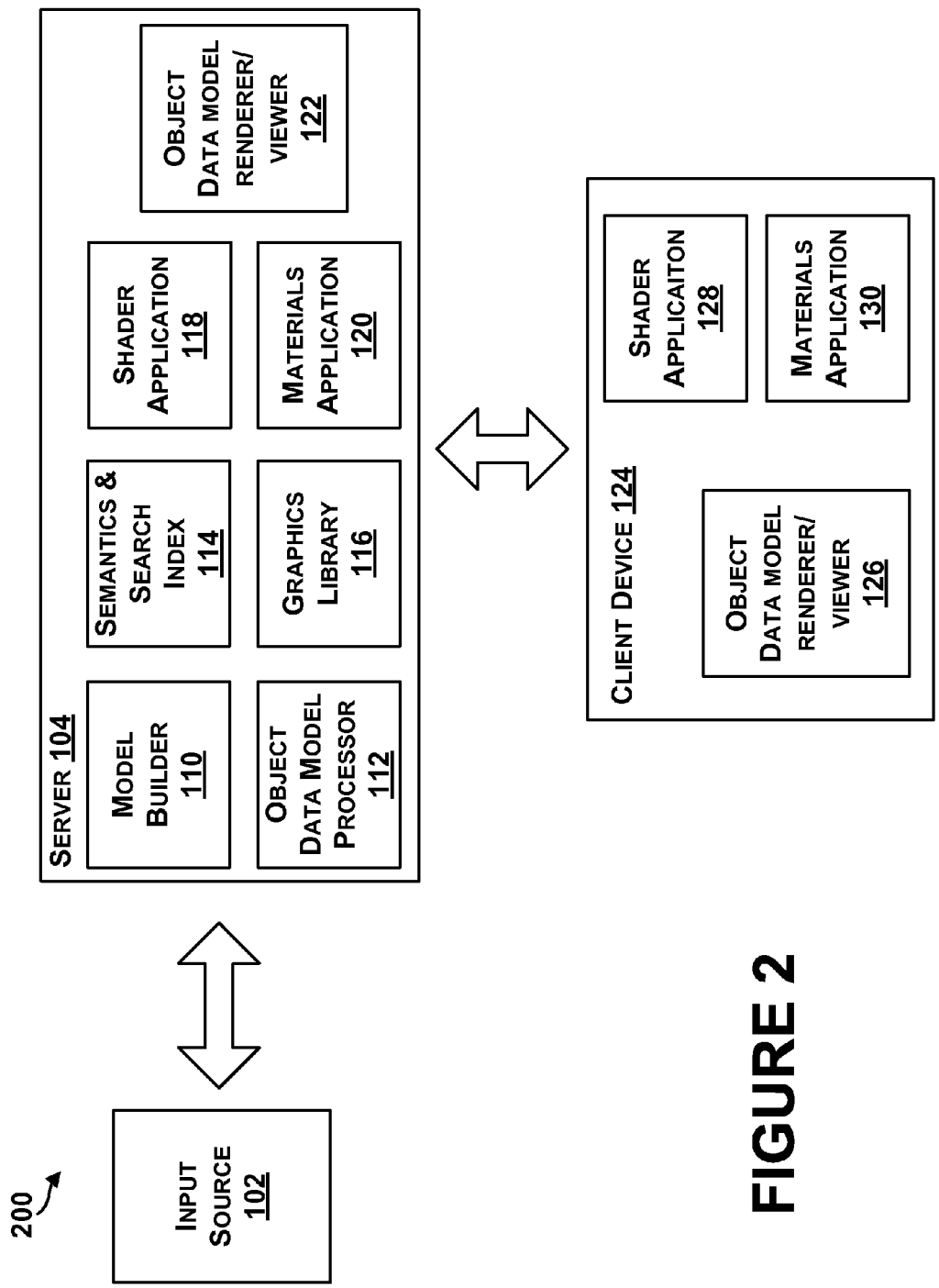
FIG. 2 illustrates another example system for object data modeling.

FIG. 2 illustrates another example system 200 for object data modeling. The system 200 includes the input source 102 coupled to the server 104, which is coupled to a client device 124. The input source 102 and the server 104 may be as described in FIG. 1. The client device 124 may receive outputs from any of the components of the server 124, and may be configured to render a 3D image.

The client device 124 includes an object data model renderer/viewer 126, a shader application 128, and a materials application 130. The object data model renderer/viewer 126, the shader application 128, and the materials application 130 may all be configured as described with respect to the object data model renderer/viewer 122, the materials application 120, and the shader application 118 of the server 104 as described with respect to FIG. 1.

In some examples, the client device 124 may receive the 3D object data model file or files from the server 104 and render a view of the object by executing the shader application 128 and the materials application 130. When executing the shader application 128 and the materials application 130, the client device 124 may access separate databases to retrieve appropriate shader and material information to apply to the image, access the server 104 to receive appropriate shader and material information from the shader application 118 and the materials application 120, or may store information locally regarding the appropriate shader and material information to apply.

In some examples, the client device 124 may receive the 3D object data model file or files from the server 104 and render a 3D image of the object. In other examples, the server 104 may render a 3D image of the object and stream the 3D image to the client device 124 for display.

In some examples, components of the client device 124 may be configured to refine material properties associated with a 3D object data model based on a comparison between a rendered view of a portion of the 3D object data model and a two-dimensional image of a product that is represented by the 3D object data model. For instance, the object data model render/viewer 126 may, in some examples, include a rendering component that is configured to render a view of a portion of a 3D object data model of an object. The view of the portion of the 3D object data model may be rendered by the rendering component based on material properties that are associated with geometry (e.g., coordinates of vertices of a polygonal mesh) of the 3D object data model. Additionally, a refinement component of the client device 124 may be configure to determine an appearance metric between an appearance of the portion in a rendered view and an appearance of the portion in a 2D image. Based on the appearance metric, the refinement component may also be configured to determine a modification to the material properties associated with the object, and provide the modified material properties to the rendering component. Also, a material component of the client device 124 may be configured to store the 3D object data model of the object having modified material properties for the portion. The modified material properties may be material properties which yield the minimum appearance metric of one or more determined appearance metrics, for example.

Although the example is described as performed by the client device 124, in some instances, the material refinement may be performed by components of the server 104, or a combination of components of the server 104 and the client device 124. Additional details of the refinement of the material properties are further described below with respect to FIGS. 3 and 4.

Figure 3:
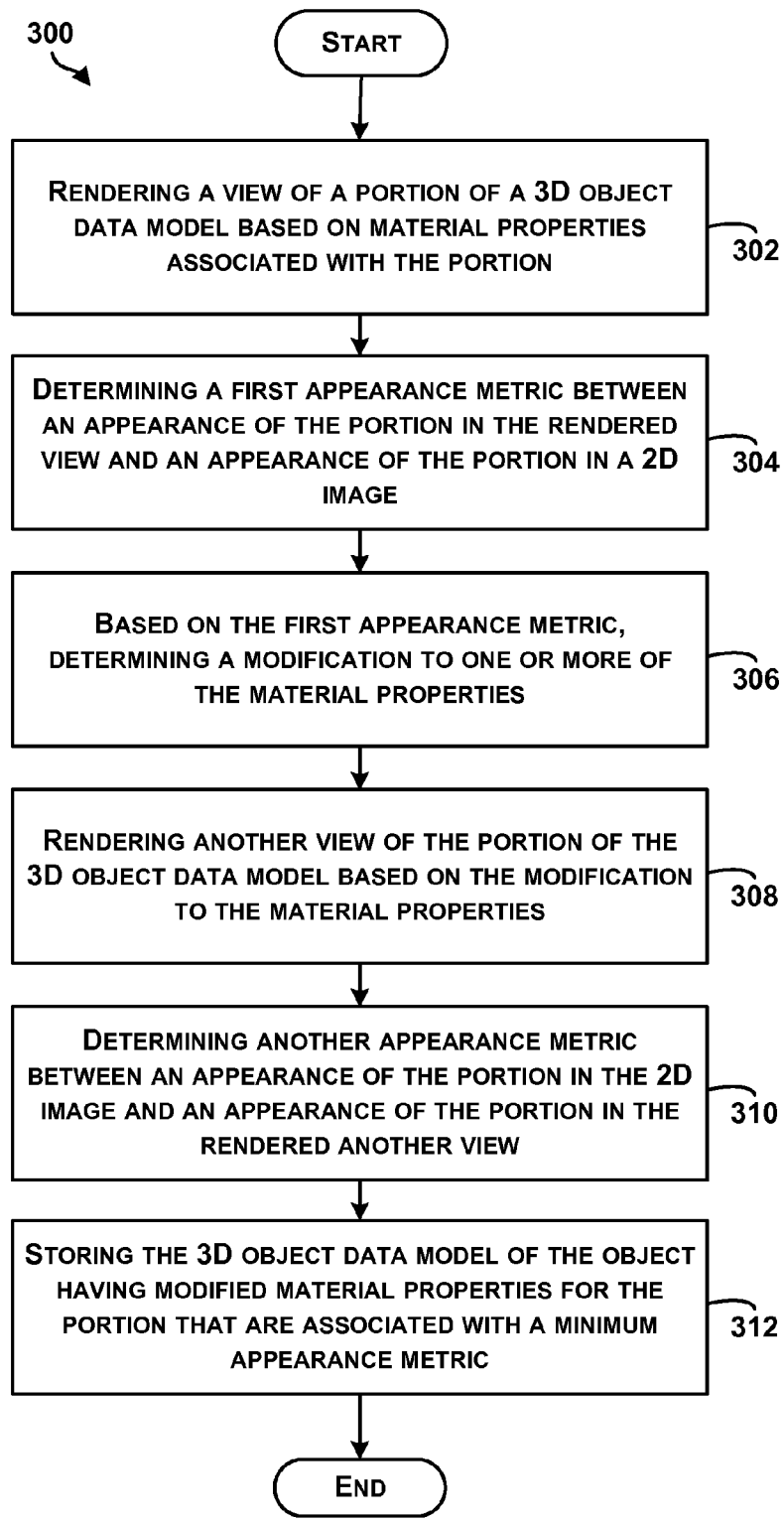
FIG. 3 is a block diagram of an example method for material refinement for a three-dimensional (3D) object data model.

FIG. 3 is a block diagram of an example method 300 for material refinement for a three-dimensional (3D) object data model. Method 300 shown in FIG. 3 presents an embodiment of a method that, for example, could be used with the system 100 or the system 200, for example, and may be performed by a device, such as any of the components illustrated in FIG. 1 or 2. Method 300 may include one or more operations, functions, or actions as illustrated by one or more of blocks 302-312. Although the blocks are illustrated in a sequential order, these blocks may also be performed in parallel, and/or in a different order than those described herein. Also, the various blocks may be combined into fewer blocks, divided into additional blocks, and/or removed based upon the desired implementation.

In addition, for the method 300 and other processes and methods disclosed herein, the block diagram shows functionality and operation of one possible implementation of present embodiments. In this regard, each block may represent a module, a segment, or a portion of program code, which includes one or more instructions executable by a processor or computing device for implementing specific logical functions or steps in the process. The program code may be stored on any type of computer readable medium, for example, such as a storage device including a disk or hard drive. The computer readable medium may include non-transitory computer readable medium, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, for example, or a tangible storage device.

In addition, for the method 300 and other processes and methods disclosed herein, each block in FIG. 3 may represent circuitry that is wired to perform the specific logical functions in the process.

Initially, at block 302, the method 300 includes rendering a view of a portion of a 3D object data model based on material properties associated with the portion. In one example, a 3D object data model that is a representation of a product, such as a mobile phone or other type of electronic device, a shoe, article of clothing, toy, or any type of object, may be received. The 3D object data model may include multiple components, each of which may be rendered using separate material assets and shader assets. For example, a mobile phone may include a display screen and a frame. The display screen may be rendered based on material attributes and shaders associated with glass, for instance, while the frame may be rendered using a shader that is applied to types of plastics or metals. As another example, the 3D object data model may be a boot, and the boot may include a rubber sole, a leather upper, and a metal clasp (each of which may be rendered based on separate material properties).

The 3D object data model may include material properties that are associated with geometry of the 3D object data model. In one example, the 3D object data model may include a list of geometry coordinates of vertices of a polygonal mesh having pointers to material attributes associated with the geometry coordinates. The material properties may identify appearance attributes or material shaders for the geometry coordinates. For example, the appearance attributes may be lighting values, texture coordinates, and/or colors that are provided as inputs for a material shader. The material shader may be configured to determine a pixel color or other rendering effect based on the appearance attributes. In another instance, the material properties may be texture maps, such as diffuse maps, bump maps, opacity maps, glow maps, or specular maps.

In one example, the portion of the 3D object data model may be a component of the 3D object data model having common material properties, such as a common texture map or material shader. For instance, if the 3D object data model is a boot, the portion may be a rubber sole of the boot (or a portion of the rubber sole). A view of solely the portion may be rendered, or a view that includes the portion as well as other portions of the 3D object data model may be rendered. In one instance, a view of 3D object data model in which the portion is visible may be rendered to match an orientation of a product that is represented by the 3D object data model in a 2D image of the product.

At block 304, the method 300 includes determining a first appearance metric between an appearance of the portion in the rendered view and an appearance of the portion in a 2D image. For instance, a manufacturer of a product may provide a 2D image of a product, or multiple 2D images for each portion or type of material/texture of the product. In one example, a digital 2D image of the product, or the portion of the product in the rendered view, may be compared with the rendered view. Any number of computer vision techniques may be employed by a computing device in order to determine an appearance metric between an appearance of the portion in the rendered view and appearance of the portion in the 2D image.

As an example, a numerical distance may be determined between a representation of a color of the portion in the 2D image and a representation of a color of the portion in the rendered view. The numerical distance may be a difference between an average pixel color of the portion in the 2D image and an average pixel color of the portion in the rendered view. For instance, an average pixel color for a portion of the 2D image or rendered view may be determined by averaging the values of a center pixel with values of pixels surrounding the pixel. The computing device may be able to determine red, green, and blue (RGB) components, hue, saturation, lightness (HSL) components, and/or hue, saturation, value (HSV) components of a pixel or group of pixels of the rendered view and 2D image by digitally analyzing the rendered view and the 2D image. Subsequently the color components may be converted to an absolute color space such that the colors may be numerically compared. The converted colors may be subtracted or otherwise compared to determine a level of match between the appearance of the portion in the 2D image and the rendered view. For instance, two colors that are close together within the color space may be more similar than two colors that are separated by a larger numerical distance in the color space. Other methods and techniques for comparing colors of the appearance of the portion in the rendered view and the 2D image are also possible, and the example is not meant to be limiting.

At block 306, the method 300 includes based on the first appearance metric, determining a modification to one or more of the material properties. In one example, the material properties may include a given shader that is configured to determine the pixel color of the portion in the rendered view. A different shader for the portion may be selected from a database, for example. The database may include multiple shaders for different types of materials, such as leather, wood, metal, plastic, rubber, etc. In some instances, a given type of material may include multiple shaders, and a different shader may be selected from within the shaders for the type of material. For example, a different shader may provide a different type of shading or may include bump mapping or translucency effects.

In further examples, when two or more shaders exist for a given type of material for a portion to be rendered, an assignment history can be accessed to make a selection. For example, based on past usage of shader of same, similar or related objects or regions of objects, the same shader may be used and selected for rendering the portion.

In another example, appearance attributes associated with the portion of the 3D object data model may be modified. For example, the portion of the 3D object data model may include a base color, texture coordinates, and lighting information, among other parameters, which are used by a shader to determine a final pixel color that is rendered or displayed on a screen. Any of the appearance attributes may be modified based on the appearance metric.

At block 308, the method 300 includes rendering another view of the portion of the 3D object data model based on the modification to the material properties. For instance after modified appearance attributes or a new shader has been selected, another view of the portion of the 3D object data model may be rendered. In some instances, the portion is rendered having the same orientation and viewpoint as the first rendered view.

At block 310, the method 300 includes determining another appearance metric between an appearance of the portion in the 2D image and an appearance of the portion in the rendered another view. The appearance metric may be determined by a computing device using the same technique as performed at block 304. For example, the appearance metric may be a numerical distance between the representation of the color of the portion in the 2D image and the representation of the color of the portion in the another rendered view.

In some instances, as part of the method 300, blocks 306, 308, and 310 are performed for one or more iterations such that multiple additional appearance metrics associated with different modified material properties are determined. At block 312, the method 300 includes storing the 3D object data model of the object having modified material properties for the portion that are associated with a minimum appearance metric. For example, modified material properties associated with a minimum appearance metric over the one or more iterations may be identified and stored with the 3D objet data model. Additionally, the method 300 may be repeated for additional portions of the 3D object data model such that material properties associated with other portions of the 3D object data model that have separate material types may be refined and modified. Thus, the material properties associated with the 3D object data model may be refined such that the appearances of portions of the 3D object data model more closely match an appearance of the product that is represented by the 3D object data model.

Figure 4:
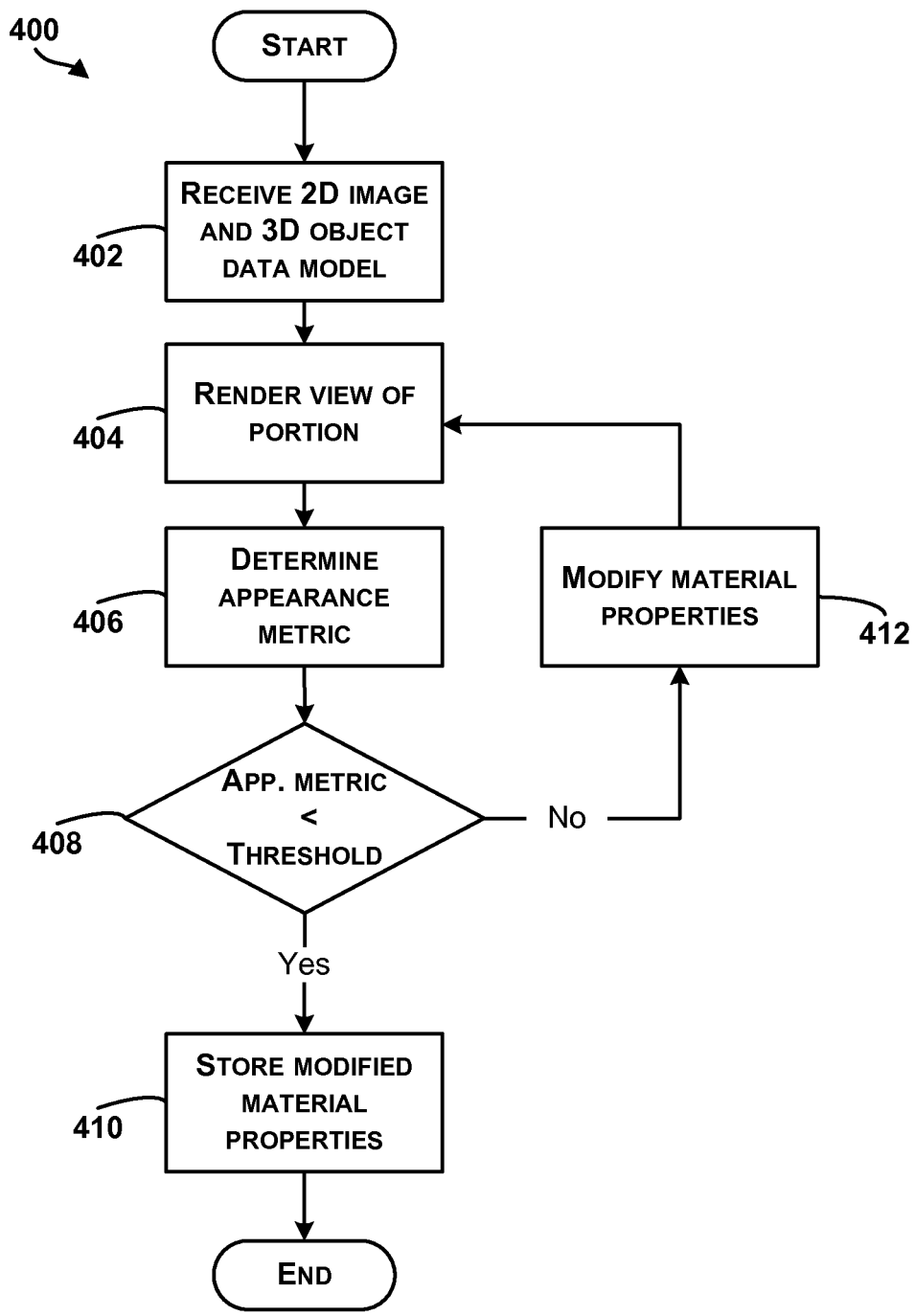
FIG. 4 is a flow chart of an example method for material refinement for a three-dimensional (3D) object data model.

FIG. 4 is a flow chart 400 of an example method for material refinement for a three-dimensional (3D) object data model. The example method shown in FIG. 4 presents an embodiment of a method that could be used by the system 100 of FIG. 1 or the system 200 of FIG. 2, or components of the system 100 or system 200, for example.

The example method may include one or more operations, functions, or actions as illustrated by blocks of the flow chart. Although the blocks are illustrated in a sequential order, these blocks may also be performed in parallel, and/or in a different order than those described herein. Also, the various blocks may be combined into fewer blocks, divided into additional blocks, and/or removed from the flow chart, based upon the desired implementation of the method. Each block may represent a module, a segment, or a portion of program code, which includes one or more instructions executable by a processor for implementing specific logical functions or steps in the process. In addition, each block in FIG. 4 may represent circuitry that is wired to perform the specific logical functions in the process.

Initially, at block 402, a 2D image of a product and a 3D object data model that is a representation of the product may be received. For example, the 2D image may be an image of a portion of the product or the whole product captured by a camera. The 3D object data model may have been acquired by scanning the product to determine material and geometry information, or the 3D object data model may have been provided by a manufacturer or engineer who has labeled portions of the 3D object data model as being of a particular type of material (e.g., wood, leather, glass, plastic, etc.). At block 404, a view of a portion of the 3D object data model may be rendered. The portion may be a portion that is labeled as being of a particular type of material, such as a type of material pictured in the 2D image.

At block 406, an appearance metric between an appearance of the portion in the rendered view and an appearance of the portion in the 2D image may be determined. As described previously, the appearance metric may be a numerical distance in a color space between a representation of the color of the portion in the 2D image and a representation of the color of the portion in the rendered view.

Moreover, at block 408, a decision may be made based on a relationship between the appearance metric and an appearance threshold. In one example, if the appearance metric is less than an appearance threshold, the method may proceed to block 410, while if the appearance metric is greater than the appearance threshold, the method may proceed to block 412.

At block 412, modified material properties may be determined for the portion of the 3D object data model. For instance, a different shader for the portion may be selected or appearance attributes that are inputs to a material shader may be modified based on the appearance metric. Following, another view of the portion may be rendered at block 404, and another appearance metric may be determined between the rendered another view and the 2D image at block 406. Additionally, at block 408, the another appearance metric may be compared to the threshold to determine whether the another appearance metric is less than the threshold. If the another appearance metric is greater than the threshold, the method may proceed to block 412, where another iteration of modifying material properties is performed. If the another appearance metric is less than the threshold, the method may proceed to block 410, where the modified material properties that yielded the another appearance metric may be stored as material properties for the portion of the 3D object data model.

While the flow chart 400 conceptually illustrates one example iterative method of refining material properties for a portion(s) of a 3D object data model, another approach to refining the material properties of the 3D object data model may be similar to an expectation-maximization (EM) algorithm. For instance, an EM algorithm is an efficient iterative procedure to compute the maximum likelihood estimate in the presence of missing or hidden data.

According to the EM algorithm, each iteration includes an E-step and an M-step. In the E-step, an expectation of a log-likelihood evaluated using a current estimate of missing model parameters is found. A likelihood may indicate how likely a parameter value is in light of an observed outcome. In the following M-step, parameters maximizing the expected log-likelihood found in the previous E-step are found. The parameters are then used for the estimate of the log-likelihood in the next E-step. It can be shown that repeating the iterations leads to convergence of the missing parameter(s) to fixed values. In the context of the material properties of a 3D object data model and a 2D image, the EM algorithm may be used to estimate appearance attributes which are inputs to a material shader and yield a pixel color represented in the 2D image. For instance, the missing parameters may be a base pixel color, texture coordinates, and/or lighting information, while the observed data may be a pixel color in the 2D image. Thus, the EM algorithm may be used to infer what appearance attributes may be used to generate a pixel color matching the 2D image pixel color with the shader. Alternatively, the EM algorithm may be used to adjust internal parameters of a shader that are used to determine a pixel color based on fixed input appearance attributes.

Figure 5:
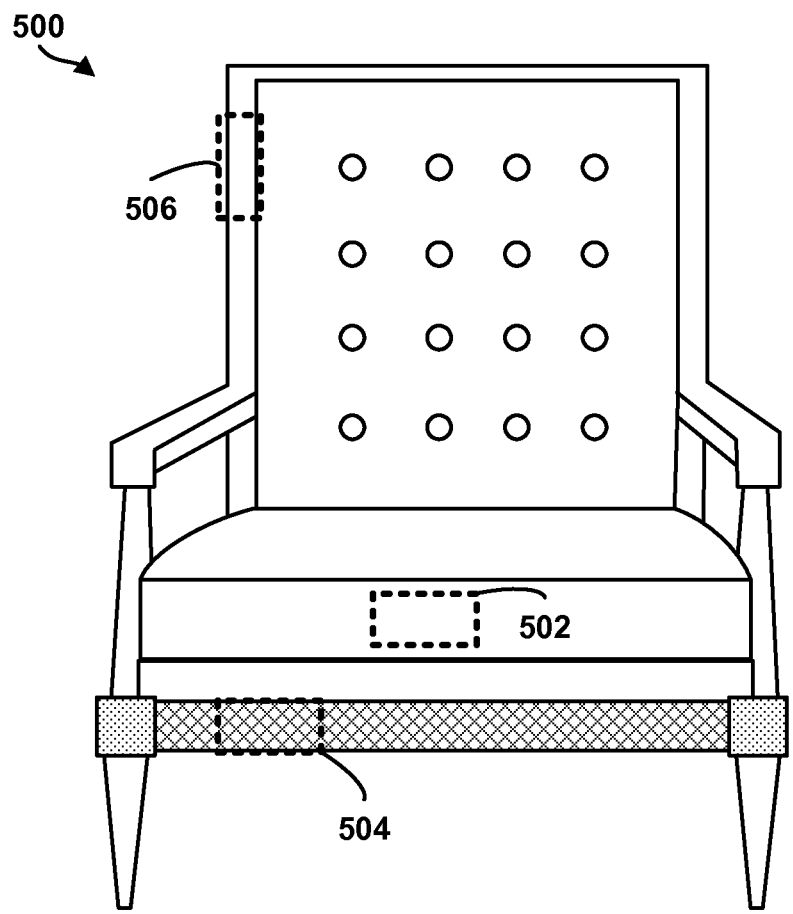
FIG. 5 is a conceptual illustration of an example rendered view of a three-dimensional (3D) object data model.

FIG. 5 is a conceptual illustration 500 of an example rendered view of a three-dimensional (3D) object data model. As shown in FIG. 5, the 3D object data model may represent a chair. In some instances, a repeating pattern within the 3D object data model may be identified. For example, the 3D object data model may be segmented into different portions based on shaders used to render adjacent points of the 3D object data model, or portions of the 3D object data model may be segmented and labeled by a manufacturer as separate portions. Within a portion, a pattern of recurring elements may be identified, and a recurring element of the pattern may be selected as an area of the 3D object data model to be matched against a 2D image. For instance, the pattern may consist of parallel lines of alternating color, adjacent polygons of different colors, interwoven strands of different colors, etc.

By selecting an area of the portion to match against the 2D image, rather than the entire portion, the refinement of the material properties associated with the 3D object data model may be improved. For example, after material properties associated with the portion have been modified, according to the method 300, for example, the material properties associated with the selected area may be applied to other recurring elements of the identified pattern throughout the portion.

As conceptually illustrated in FIG. 5, a first area 502 may be a portion of a cushion of the chair having a cotton pattern of woven thread. After the material properties for the first area 502 have been modified, the material properties may be similarly modified for the remainder of the cushion of the chair. For instance, a new shader may be selected for the first area 502, and the new shader may also be applied to the remainder of the cushion. Other examples of a selected area include a second area 504 that is part of a lower frame of the chair and a third area 506 that is part of an upper frame of the chair. Thus, the portion of the 3D object data model that is matched against the 2D image may be a selected area of a component of the 3D object data model.

Figure 6:
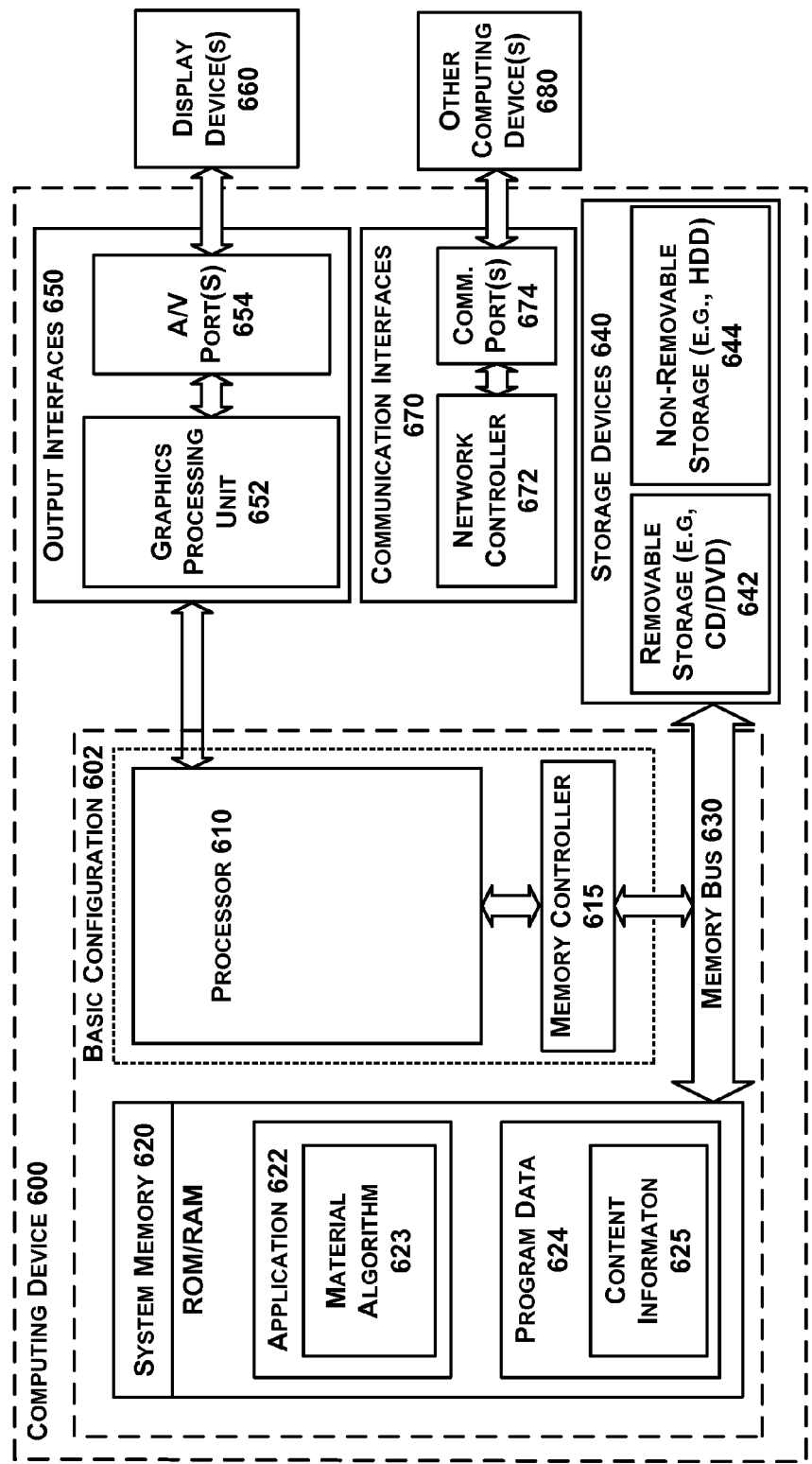
FIG. 6 is a functional block diagram illustrating an example computing device used in a computing system that is arranged in accordance with at least some embodiments described herein.

FIG. 6 is a functional block diagram illustrating an example computing device 600 used in a computing system that is arranged in accordance with at least some embodiments described herein. The computing device 600 may be a personal computer, mobile device, cellular phone, touch-sensitive wristwatch, tablet computer, video game system, or global positioning system, and may be implemented to provide a method for material refinement for 3D object data models as described in FIGS. 1-5. In a basic configuration 602, computing device 600 may typically include one or more processors 610 and system memory 620. A memory bus 630 can be used for communicating between the processor 610 and the system memory 620. Depending on the desired configuration, processor 610 can be of any type including but not limited to a microprocessor (µP), a microcontroller (µC), a digital signal processor (DSP), or any combination thereof. A memory controller 615 can also be used with the processor 610, or in some implementations, the memory controller 615 can be an internal part of the processor 610.

Depending on the desired configuration, the system memory 620 can be of any type including but not limited to volatile memory (such as RAM), non-volatile memory (such as ROM, flash memory, etc.) or any combination thereof. System memory 620 may include one or more applications 622, and program data 624. Application 622 may include a material algorithm 623 that is arranged to provide inputs to the electronic circuits, in accordance with the present disclosure. Program data 624 may include content information 625 that could be directed to any number of types of data. In some example embodiments, application 622 can be arranged to operate with program data 624 on an operating system.

Computing device 600 can have additional features or functionality, and additional interfaces to facilitate communications between the basic configuration 602 and any devices and interfaces. For example, data storage devices 640 can be provided including removable storage devices 642, non-removable storage devices 644, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Computer storage media can include volatile and nonvolatile, non-transitory, removable and non-removable media implemented in any method or technology for storage of information, such as computer readable instructions, data structures, program modules, or other data.

System memory 620 and storage devices 640 are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 600. Any such computer storage media can be part of computing device 600.

Computing device 600 can also include output interfaces 650 that may include a graphics processing unit 652, which can be configured to communicate to various external devices such as display devices 660 or speakers via one or more A/V ports or a communication interface 670. The communication interface 670 may include a network controller 672, which can be arranged to facilitate communications with one or more other computing devices 680 over a network communication via one or more communication ports 674. The communication connection is one example of a communication media. Communication media may be embodied by computer readable instructions, data structures, program modules, or other data in a modulated data signal, such as a carrier wave or other transport mechanism, and includes any information delivery media. A modulated data signal can be a signal that has one or more of its characteristics set or changed in such a manner as to encode information in the signal. By way of example, and not limitation, communication media can include wired media such as a wired network or direct-wired connection, and wireless media such as acoustic, radio frequency (RF), infrared (IR) and other wireless media.

Computing device 600 can be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 600 can also be implemented as a personal computer including both laptop computer and non-laptop computer configurations.

In some embodiments, the disclosed methods may be implemented as computer program instructions encoded on a non-transitory computer-readable storage media in a machine-readable format, or on other non-transitory media or articles of manufacture. FIG. 7 is a schematic illustrating a conceptual partial view of an example computer program product 700 that includes a computer program for executing a computer process on a computing device, arranged according to at least some embodiments presented herein.

In one embodiment, the example computer program product 700 is provided using a signal bearing medium 701. The signal bearing medium 701 may include one or more programming instructions 702 that, when executed by one or more processors may provide functionality or portions of the functionality described above with respect to FIGS. 1-6. In some examples, the signal bearing medium 701 may encompass a computer-readable medium 703, such as, but not limited to, a hard disk drive, a Compact Disc (CD), a Digital Video Disk (DVD), a digital tape, memory, etc. In some implementations, the signal bearing medium 701 may encompass a computer recordable medium 704, such as, but not limited to, memory, read/write (R/W) CDs, R/W DVDs, etc. In some implementations, the signal bearing medium 901 may encompass a communications medium 705, such as, but not limited to, a digital and/or an analog communication medium (e.g., a fiber optic cable, a waveguide, a wired communications link, a wireless communication link, etc.). Thus, for example, the signal bearing medium 701 may be conveyed by a wireless form of the communications medium 705 (e.g., a wireless communications medium conforming with the IEEE 802.11 standard or other transmission protocol).

The one or more programming instructions 702 may be, for example, computer executable and/or logic implemented instructions. In some examples, a computing device such as the computing device 600 of FIG. 6 may be configured to provide various operations, functions, or actions in response to the programming instructions 702 conveyed to the computing device 600 by one or more of the computer readable medium 703, the computer recordable medium 704, and/or the communications medium 705.

It should be understood that arrangements described herein are for purposes of example only. As such, those skilled in the art will appreciate that other arrangements and other elements (e.g. machines, interfaces, functions, orders, and groupings of functions, etc.) can be used instead, and some elements may be omitted altogether according to the desired results. Further, many of the elements that are described are functional entities that may be implemented as discrete or distributed components or in conjunction with other components, in any suitable combination and location.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims, along with the full scope of equivalents to which such claims are entitled. It is also to be understood that the terminology used herein is for the purpose of describing particular embodiments only, and is not intended to be limiting.

What is claimed is:

1. A method, comprising:

rendering a view of a portion of a three-dimensional (3D) object data model of an object based on material properties associated with the portion, wherein the 3D object data model comprises material properties associated with geometry of the 3D object data model;

determining, using a computing device, a first appearance metric between an appearance of the portion in the rendered view and an appearance of the portion in a two-dimensional (2D) image by comparing the appearance of the portion in the rendered view with the appearance of the portion in the 2D image;

for one or more iterations:
based on the first appearance metric, determining a modification to one or more of the material properties associated with the portion;
rendering another view of the portion of the 3D object data model based on the modification to the material properties associated with the portion; and
determining, using the computing device, another appearance metric between an appearance of the portion in the 2D image and an appearance of the portion in the rendered another view; and
storing the 3D object data model of the object having modified material properties for the portion, wherein the modified material properties are associated with a minimum appearance metric of the one or more iterations.

2. The method of claim 1, wherein the first appearance metric comprise a numerical distance between a representation of a color of the portion in the 2D image and a representation of a color of the portion in the rendered view.

3. The method of claim 1, wherein the material properties associated with the portion comprise appearance attributes, and the method further comprises rendering the another view of the portion using a given shader, wherein the shader is configured to determine rendering effects for the portion based on the appearance attributes.

4. The method of claim 3, wherein determining a modification to the material properties associated with the portion comprises determining another shader for the portion.

5. The method of claim 4, further comprising selecting the another shader from a plurality of shaders of a material database.

6. The method of claim 3, wherein determining a modification to the material properties associated with the portion comprises determining modified appearance attributes for the portion.

7. The method of claim 1, further comprising:
identifying, using the computing device, a repeating pattern within the material properties associated with the 3D object data model;
determining the portion of the 3D object data model based on the repeating pattern, wherein the portion comprises a recurring element of the repeating pattern; and
applying the modified material properties to one or more additional portions of the 3D object data model for the stored 3D object data model, wherein the additional portions correspond to additional elements of the repeating pattern.

8. A non-transitory computer-readable medium having stored therein instructions, that when executed by a computing device, cause the computing device to perform functions comprising:
rendering a view of a portion of a three-dimensional (3D) object data model of an object based on material properties associated with the portion, wherein the 3D object data model comprises material properties associated with geometry of the 3D object data model;
determining a first appearance metric between an appearance of the portion in the rendered view and an appearance of the portion in a two-dimensional (2D) image by comparing the appearance of the portion in the rendered view with the appearance of the portion in the 2D image;
for one or more iterations:
based on the first appearance metric, determining a modification to one or more of the material properties associated with the portion;
rendering another view of the portion of the 3D object data model based on the modification to the material properties associated with the portion; and
determining another appearance metric between an appearance of the portion in the 2D image and an appearance of the portion in the rendered another view; and
storing the 3D object data model of the object having modified material properties for the portion, wherein the modified material properties are associated with a minimum appearance metric of the one or more iterations.

9. The non-transitory computer-readable medium of claim 8, wherein the first appearance metric comprise a numerical distance between a representation of a color of the portion in the 2D image and a representation of a color of the portion in the rendered view.

10. The non-transitory computer-readable medium of claim 8, wherein the material properties associated with the portion comprise appearance attributes, and wherein the functions further comprise rendering the another view of the portion using a given shader, wherein the shader is configured to determine rendering effects for the portion based on the appearance attributes.

11. The non-transitory computer-readable medium of claim 10, wherein determining a modification to the material properties associated with the portion comprises determining another shader for the portion.

12. The non-transitory computer-readable medium of claim 11, wherein the functions further comprise selecting the another shader from a plurality of shaders of a material database.

13. The non-transitory computer-readable medium of claim 10, wherein determining a modification to the material properties associated with the portion comprises determining modified appearance attributes for the portion.

14. The non-transitory computer-readable medium of claim 8, wherein the functions further comprise:
identifying a repeating pattern within the material properties associated with the 3D object data model;
determining the portion of the 3D object data model based on the repeating pattern, wherein the portion comprises a recurring element of the repeating pattern; and
applying the modified material properties to one or more additional portions of the 3D object data model for the stored 3D object data model, wherein the additional portions correspond to additional elements of the repeating pattern.

15. A system, comprising:
a rendering component, the rendering component configured to render a view of a portion of a three-dimensional (3D) object data model of an object based on material properties associated with geometry of the 3D object data model;
a refinement component, the refinement component configured to perform the following functions for one or more iterations:
determine an appearance metric between an appearance of the portion in a view that is rendered by the rendering component and an appearance of the portion in a two-dimensional (2D) image by comparing the appearance of the portion in the view that is rendered with the appearance of the portion in the 2D image;
determine a modification to one or more of the material properties associated with portion based on the appearance metric; and
provide the modification to the rendering component; and
a material component, the material component configured to store the 3D object data model of the object having modified material properties for the portion, wherein the modified material properties are associated with a minimum appearance metric of the one or more iterations.

16. The system of claim 15, wherein the appearance metric comprise a numerical distance between a representation of a color of the portion in the 2D image and a representation of a color of the portion in the rendered view.

17. The system of claim 15, wherein the material properties associated with the portion comprise appearance attributes, and wherein the rendering component is further configured to render the view of the portion using a given shader, wherein the shader is configured to determine rendering effects for the portion based on the appearance attributes.

18. The system of claim 17, wherein the refinement component determining a modification to the material properties associated with the portion comprises determining another shader for the portion.

19. The system of claim 18, wherein the refinement component is further configured to select the another shader from a plurality of shaders of a material database.

20. The system of claim 15, wherein the material component is further configured to:
   identify a repeating pattern within the material properties associated with the 3D object data model, wherein the portion of the 3D object data model comprises a recurring element of the repeating pattern; and
   apply the modified material properties to one or more additional portions of the 3D object data model for the stored 3D object data model, wherein the additional portions correspond to additional elements of the repeating pattern.

* * * * *